US007660442B2

(12) United States Patent
Sweeney et al.

(10) Patent No.: US 7,660,442 B2
(45) Date of Patent: Feb. 9, 2010

(54) METHOD AND SYSTEM FOR CAPTURING FINGERPRINTS, PALM PRINTS AND HAND GEOMETRY

(75) Inventors: Latanya Arvette Sweeney, Pittsburgh, PA (US); Victor Walter Weedn, Kitanning, PA (US); Ralph Gross, Pittsburgh, PA (US)

(73) Assignee: Handshot, LLC, Cambridge, MA (US)

( * ) Notice: Subject to any disclaimer, the term of this patent is extended or adjusted under 35 U.S.C. 154(b) by 691 days.

(21) Appl. No.: 11/515,228

(22) Filed: Sep. 1, 2006

(65) Prior Publication Data

US 2008/0056539 A1 Mar. 6, 2008

(51) Int. Cl.
*G06K 9/00* (2006.01)
*G06K 9/36* (2006.01)
*G06F 21/00* (2006.01)

(52) U.S. Cl. .................. 382/115; 382/190; 382/284; 713/186

(58) Field of Classification Search ................ 382/100, 382/115–125, 181, 190–195, 199, 206, 216, 382/278, 284, 285, 293–294; 713/182, 186
See application file for complete search history.

(56) References Cited

U.S. PATENT DOCUMENTS

| | | | | |
|---|---|---|---|---|
| 4,206,441 A | * | 6/1980 | Kondo | 382/115 |
| 4,752,966 A | * | 6/1988 | Schiller | 382/125 |
| 4,896,363 A | * | 1/1990 | Taylor et al. | 382/125 |
| 5,073,950 A | * | 12/1991 | Colbert et al. | 382/115 |
| 5,321,765 A | * | 6/1994 | Costello | 382/125 |
| 5,335,288 A | * | 8/1994 | Faulkner | 382/115 |
| 5,483,601 A | * | 1/1996 | Faulkner | 382/115 |
| 5,528,355 A | * | 6/1996 | Maase et al. | 356/71 |
| 5,583,950 A | * | 12/1996 | Prokoski | 382/212 |
| 5,631,972 A | * | 5/1997 | Ferris et al. | 382/125 |
| 5,790,674 A | * | 8/1998 | Houvener et al. | 713/185 |
| 6,628,813 B2 | | 9/2003 | Scott et al. | |
| 6,956,608 B1 | | 10/2005 | Shapiro et al. | |
| 6,983,062 B2 | | 1/2006 | Smith | |
| 7,047,419 B2 | * | 5/2006 | Black | 713/186 |
| 7,218,761 B2 | * | 5/2007 | McClurg et al. | 382/127 |
| 7,327,858 B2 | * | 2/2008 | Weiss | 382/115 |
| 7,392,939 B2 | * | 7/2008 | Hauke et al. | 235/380 |

(Continued)

OTHER PUBLICATIONS

Jain et al.; "A Prototype Hand Geometry-Based Verification System"; Appeared in Proc. of 2nd Int'l Conference on AVBPA; Mar. 22-24, 1999; pp. 166-171; Washington D.C., USA.

(Continued)

*Primary Examiner*—Manav Seth
(74) *Attorney, Agent, or Firm*—The Webb Law Firm

(57) ABSTRACT

A system and method for capturing biometric data from a hand includes a low resolution camera for recognizing the existence of a hand and determining when the hand is in an optimal position and orientation to capture the biometric data. A plurality of high resolution cameras photographs respective sections of the palm and fingers while several lights illuminate the sections from different directions in rapid sequence. A processor then tiles together the respective images, matches the friction ridges between adjacent images, adjusts the images to account for curvature, and selects individual pixels from the several images to obtain maximum contrast. Conversions of the resulting images into standard formats, such as grayscale, black and white, or simulated rolled ink fingerprint equivalents are also included.

23 Claims, 12 Drawing Sheets

U.S. PATENT DOCUMENTS

| | | | |
|---|---|---|---|
| 7,397,943 B2 * | 7/2008 | Merbach et al. | 382/154 |
| 7,574,609 B2 * | 8/2009 | Eckert et al. | 713/186 |
| 2005/0117784 A1 | 6/2005 | Merbach et al. | |
| 2006/0023919 A1 * | 2/2006 | Okamura et al. | 382/115 |
| 2006/0045316 A1 * | 3/2006 | Hauke et al. | 382/116 |
| 2006/0078170 A1 * | 4/2006 | Kamata et al. | 382/115 |
| 2006/0120576 A1 * | 6/2006 | Chen | 382/124 |
| 2006/0182318 A1 * | 8/2006 | Shigeta | 382/124 |
| 2006/0243803 A1 * | 11/2006 | Hauke et al. | 235/454 |
| 2007/0274574 A1 * | 11/2007 | Boult et al. | 382/119 |
| 2008/0232654 A1 * | 9/2008 | Bolle et al. | 382/124 |
| 2008/0260214 A1 * | 10/2008 | Hauke et al. | 382/124 |

OTHER PUBLICATIONS

Zheng et al.; "Projective Invariant Hand Geometry: An Overview"; Biometric Symposium; 2005; 2 pages; Colorado Springs, CO, USA.

* cited by examiner

METHOD AND SYSTEM FOR CAPTURING FINGERPRINTS, PALM PRINTS AND HAND GEOMETRY

BACKGROUND OF THE INVENTION

1. Field of the Invention

The present invention relates to fingerprint and palm print capturing devices and, more particularly, to a device and method for touchlessly obtaining fingerprints and palm prints using a plurality of cameras and lights to quickly and efficiently capture all such biometric information.

2. Description of Related Art

Fingerprints are unique to each individual person and, as such, have been a cornerstone for identification, recognition and authentication of people. Since the pattern of friction ridges is invariant over a person's lifetime aside from any deforming injuries, fingerprints are especially useful for forensic investigations, background checks and security. In addition to one's fingerprint, there is a great deal of distinguishing information contained in the friction ridges of the palm, as well as the sides and tips of the fingers. Hand geometry, the shapes and relative proportions of parts of the hand, also contains distinguishing information.

Today, fingerprints are typically acquired using ink and cards, "live-scan" inkless scanners or optical sensors. Examples of live-scan technology are disclosed in U.S. Pat. No. 6,983,062 to Smith and U.S. Pat. No. 6,628,813 to Scott. An example of an optical sensor is disclosed in U.S. Pat. No. 6,956,608 to Shapiro et al. The ink, live-scan and optical methods usually require trained operators to be present to ensure that the prints have been captured properly, and the process can take up to five or ten minutes to capture a full set of prints. Also, they require rolling of the fingers from nail to nail to capture the friction ridges on the sides of the fingers. These methods are subject to human error in the rolling, as well as sensitivity to contamination, moisture, or excessive dryness. Different amounts of pressure in the rolling can also result in unwanted variation between different prints of the same finger. Some live-scan and optical devices capture only fingerprints, but others will also capture palm prints.

There has been some recent development in touchless fingerprint capturing. Presently, these inventions are directed toward capturing one fingerprint at a time, excluding the tips. Two devices which use cameras and lights to capture fingerprints are disclosed in U.S. Patent Application Publications 2005/017784 to Merbach et al. and 2006/0045316 to Hauke et al. These devices use several light sources to maximize contrast and avoid shadows in the images. Merbach discloses the use of different colors of light in order to improve contrast. The lights and cameras are used in conjunction with each other to sequentially capture images of different parts of the finger from different directions. A method for piecing together several images to create a continuous model of the fingerprint is also incorporated. Hauke further discloses projecting the three-dimensional model surface of the finger onto a plane.

Generally, the more information which can be extracted from a hand, the more effective and useful the prints obtained will be for background checks, forensic investigations, security, etc. Also, fingerprint and palm print technology is becoming particularly necessary in airports and border patrols to prevent terrorism and other criminal activity. In all of these contexts, the prints captured are often compared with those in large databases. Thus, there is an escalating need for fast, accurate and complete fingerprint and palm print capturing to serve these purposes. However, the presently available touchless technology inefficiently requires fingerprints to be captured one at a time, and fails to capture the majority of the biometric information on the hand as a whole. Furthermore, the prior art capture devices introduce operator error or incorrect data capture. For example, because only one finger is scanned at a time, it may be the case that the wrong finger is inserted for scanning purposes, either unintentionally or deliberately. Therefore, the resultant captured fingerprint data may be incorrect with respect to the intended digital representation of a particular finger. Additionally, the prior art captures only the front and sides of the distal ends of the fingers and thumb. Information contained on the more proximal surfaces of the fingers, the tips of the fingers, and the palm is not captured by the devices disclosed in Merbach and Hauke. Such additional information is very useful for identification, recognition and authentication and, as such, there is a need for systems and methods which can capture all such information accurately and efficiently.

SUMMARY OF THE INVENTION

The present invention addresses the need for a complete, accurate and fast capture of all of the surfaces on hands which contain biometric information which is useful for identification, recognition and authentication. Using a plurality of cameras and lights, the present invention is capable of capturing all of the biometric data contained on the palm, fingers and thumb in a single quick capturing sequence. The present invention can also perform compilations, optimizations and manipulations of the raw image data captured by the cameras for various purposes.

The present invention is a system for capturing biometric data of a hand, which includes an enclosure having an opening adapted to receive a hand in a first orientation and a low resolution camera within the enclosure, wherein the camera is positioned substantially perpendicular to the palm of the hand so as to capture the palm, fingers and thumb of the hand in a single image. The enclosure desirably has an interior surface which is substantially non-reflective, and may optionally be contoured and configured to engage with a hand to retain the position of the hand in the optimal orientation. The system also includes a plurality of high resolution cameras arranged in a substantially arc-shaped configuration, wherein the high resolution cameras are positioned to capture images corresponding to respective sections of a biometric region of the hand, such that the images captured by said high resolution cameras, when combined, span the biometric region of the hand. The system also includes a plurality of lights within the enclosure positioned to illuminate each respective section of the biometric region from at least three different directions. The lights may desirably be blue LEDs.

A processor is connected to the low resolution camera, the high resolution cameras and the lights. The processor is configured to receive first image data of the hand positioned in the first orientation from the low resolution camera, analyze the first image data to determine if the first orientation of the hand is in the optimal orientation, and flash the lights. The processor is also configured to receive second image data of the respective sections of the biometric region from the high resolution cameras, construct a gross map of the hand using the first image data, tile the second image data onto the corresponding areas of the gross map, and match friction ridges between adjacent images of the second image data. Furthermore, the processor is configured to adjust the respective images in the second image data to account for curvature of the biometric region and ensure continuity between adjacent images, and perform a pixel selecting algorithm of the images in the second image data to select pixels which show the greatest contrast between the peaks and valleys of the friction ridges. The processor may further be configured to convert the second image data into grayscale images, convert the grayscale images into black and white images and apply a pressure deformation algorithm to the black and white images.

The system may also include a storage unit for storing the first image data, second image data and output data from the processor. The system may also include a display connected to the processor, wherein the display is capable of displaying the first and second image data and output data. The processor may also be connected to a database of images containing the biometric information from other hands, wherein the processor is configured to cross-reference output from the processor with the database. The output may be converted to a rolled ink equivalent prior to comparison with the biometric information.

The present invention is also a method for capturing biometric data of a hand which can be used with the present system. The method includes imaging a predefined area by capturing a plurality of images of the hand within the predefined area and analyzing each of the plurality of images to determine if the hand is in an optimal orientation to capture images of a biometric region of the hand. The analysis of the hand orientation may be done using active appearance models. The method also includes flashing one light out of a plurality of lights and capturing at least one image of at least one respective section of the biometric region during the flash of light and storing the images of respective sections of the biometric region on a storage device. The lights in the plurality of lights may be flashed individually in a rapid sequence, wherein multiple respective sections of the biometric region are captured during each flash.

Furthermore, the method includes constructing a gross map of the hand, tiling images of respective sections of the biometric region onto the gross map, matching the friction ridges between adjacent images of respective sections of the biometric region, and adjusting the images of respective sections of the biometric region to account for curvature of the biometric region and to ensure continuity between adjacent images. Also, the method includes the step of performing a pixel selection algorithm to select the pixels in the images of respective sections of the biometric region which show the greatest contrast between peaks and valleys of friction ridges on the hand.

An exemplary use of the obtained biometric data includes the transmission thereof to a remote computer. The biometric data may then be compared to biometric data of hands stored on the remote computer. The biometric data of the hand may be converted either locally or remotely into a rolled ink equivalent. If the rolled ink equivalent is obtained on a local level, the rolled ink equivalent may be transmitted to the remote computer where it is compared to other biometric data of a hand stored on the remote computer. It may be the case that the other biometric data of a hand stored on the remote computer was previously converted from a photographed latent hand print. Accordingly, it is to be understood that various biometric data formats are envisioned to be ultimately compared to the biometric data captured by the present invention.

Desirably, the system conforms to various standards, industry, federal or otherwise. For example, captured biometric data should adhere to standards including, but not limited to, predefined lossless compression, resolution, color bit imaging and file format standards. The system can also be configured to distinguish actual biometric information from non-recordable information, such as bandages, worn surfaces and amputations.

Since the method and system of the present invention captures the entire hand at once, it obtains a maximum amount of biometric information in a minimal amount of time. These and other advantages of the present invention will be understood from the description of the desirable embodiments, taken with the accompanying drawings, wherein like reference numerals represent like elements throughout.

DETAILED DESCRIPTION OF THE INVENTION

The present invention will now be described with reference to the accompanying figures. It is to be understood that the specific system illustrated in the attached figures and described in the following specification is simply an exemplary embodiment of the present invention.

Figure 1:
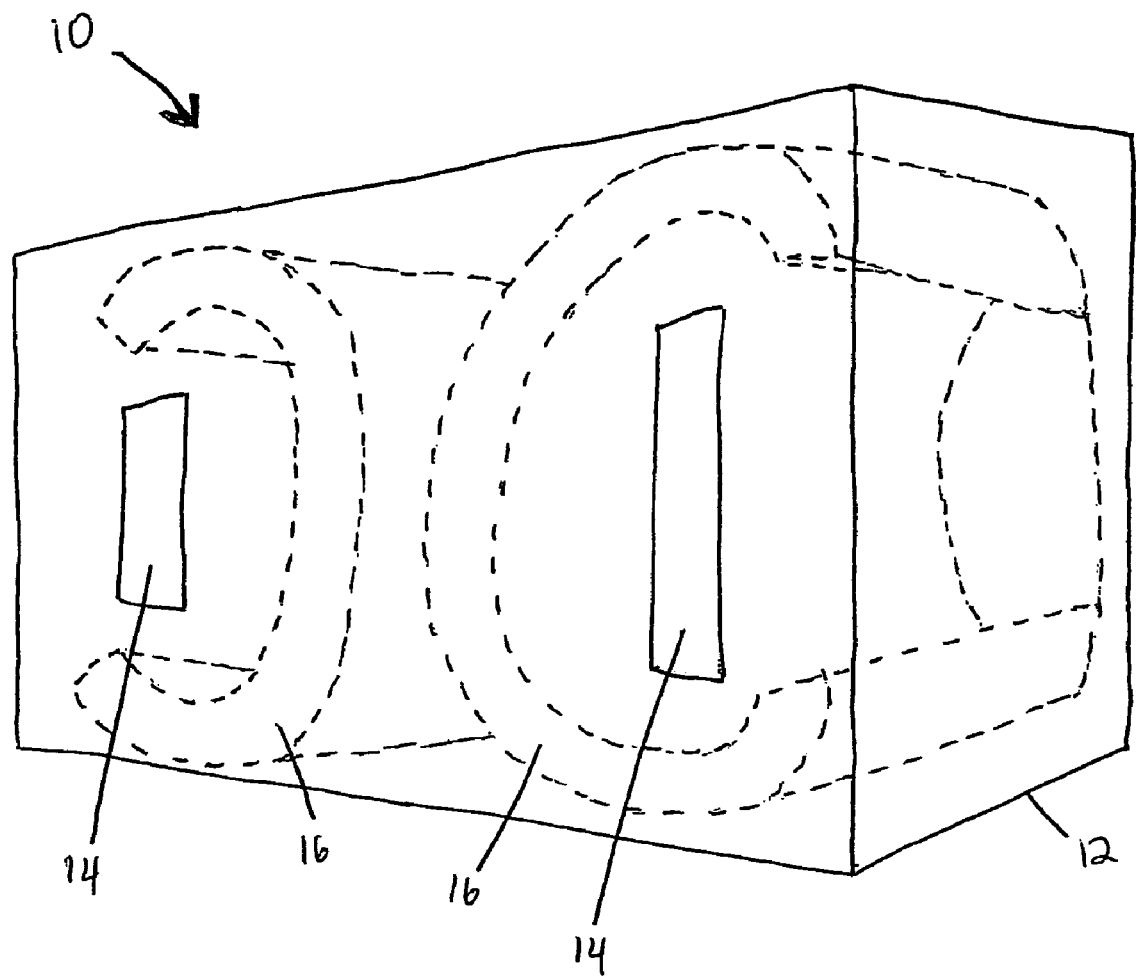
FIG. 1 is a perspective view of a desirable embodiment of the system for capturing fingerprints, palm prints and hand geometry, showing plates in broken lines within the enclosure.
Figure 2:
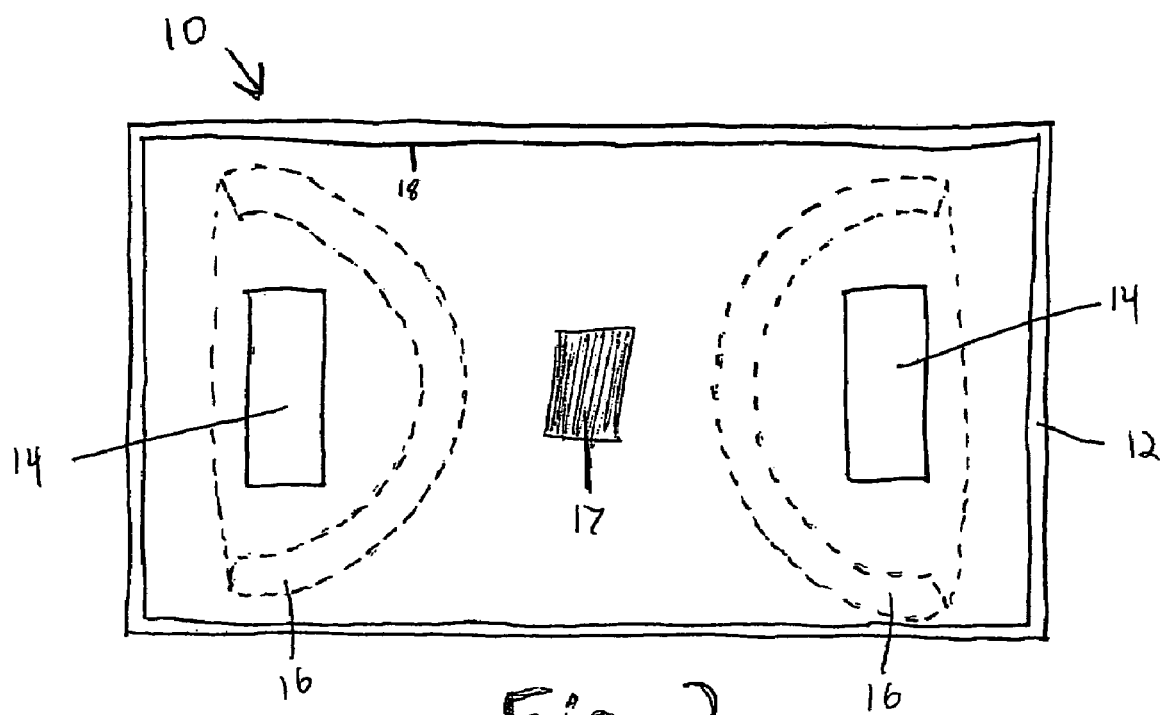
FIG. 2 is a front view of the system shown in FIG. 1.
Figure 3:
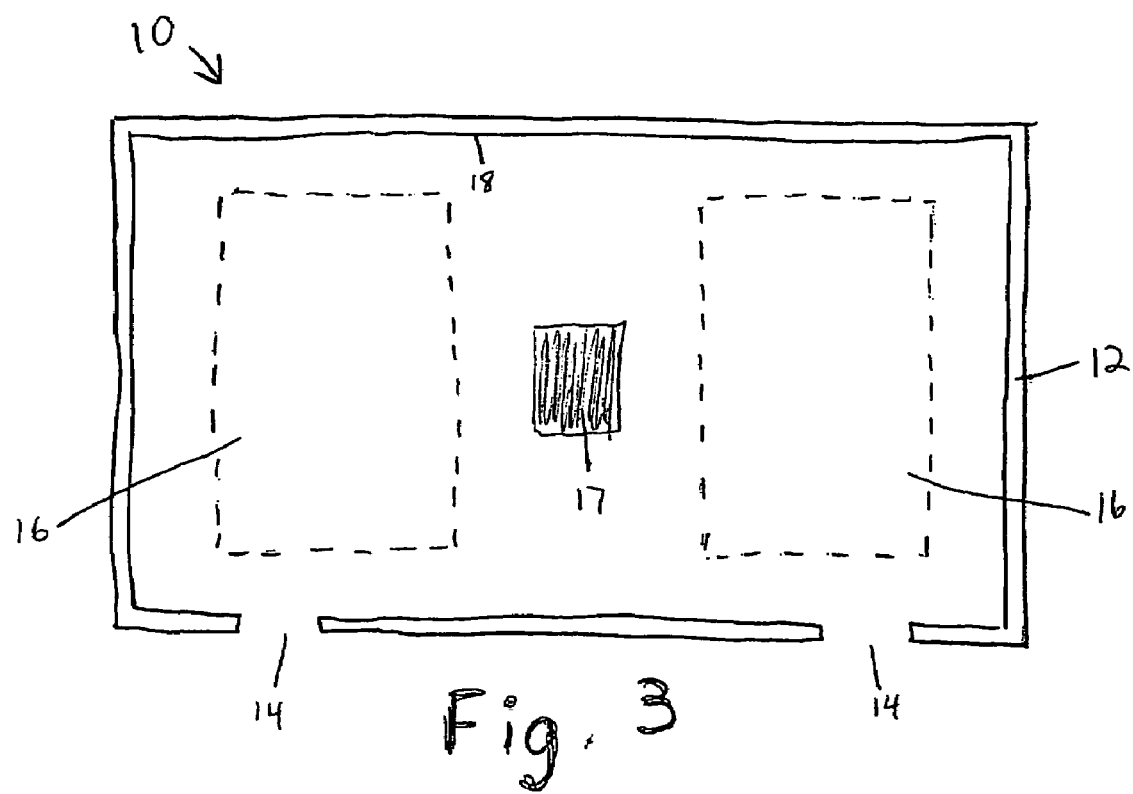
FIG. 3 is a top view of the system shown FIG. 1.

Referring to FIGS. 1-3, the system 10 includes an enclosure 12, two openings 14, two plates 16, and a processor 17. The enclosure 12 may be constructed out of plastic, wood, metal, or any other substantially opaque material suitable for constructing a rigid enclosure containing the elements of the system 10. The interior surface 18 of the enclosure 12 is desirably non-reflective, and is uniform and dark in color for reasons set forth below. The openings 14 are adapted to receive human hands into the enclosure 12, but the openings 14 are small enough that a minimal amount of external light can penetrate the openings 14 into the enclosure 12. Once the hands are inserted though the openings 14 such that the palms of the hands are facing the processor 17, the palm sides of the hands are surrounded by the plates 16. While the embodiment shown in FIGS. 1-3 is configured such that the palms of the hands are perpendicular to the ground, a similar embodiment could be constructed such that the palms are parallel to the ground, with the plates 16 positioned to surround the palm sides of the hands from above or below.

Figure 4:
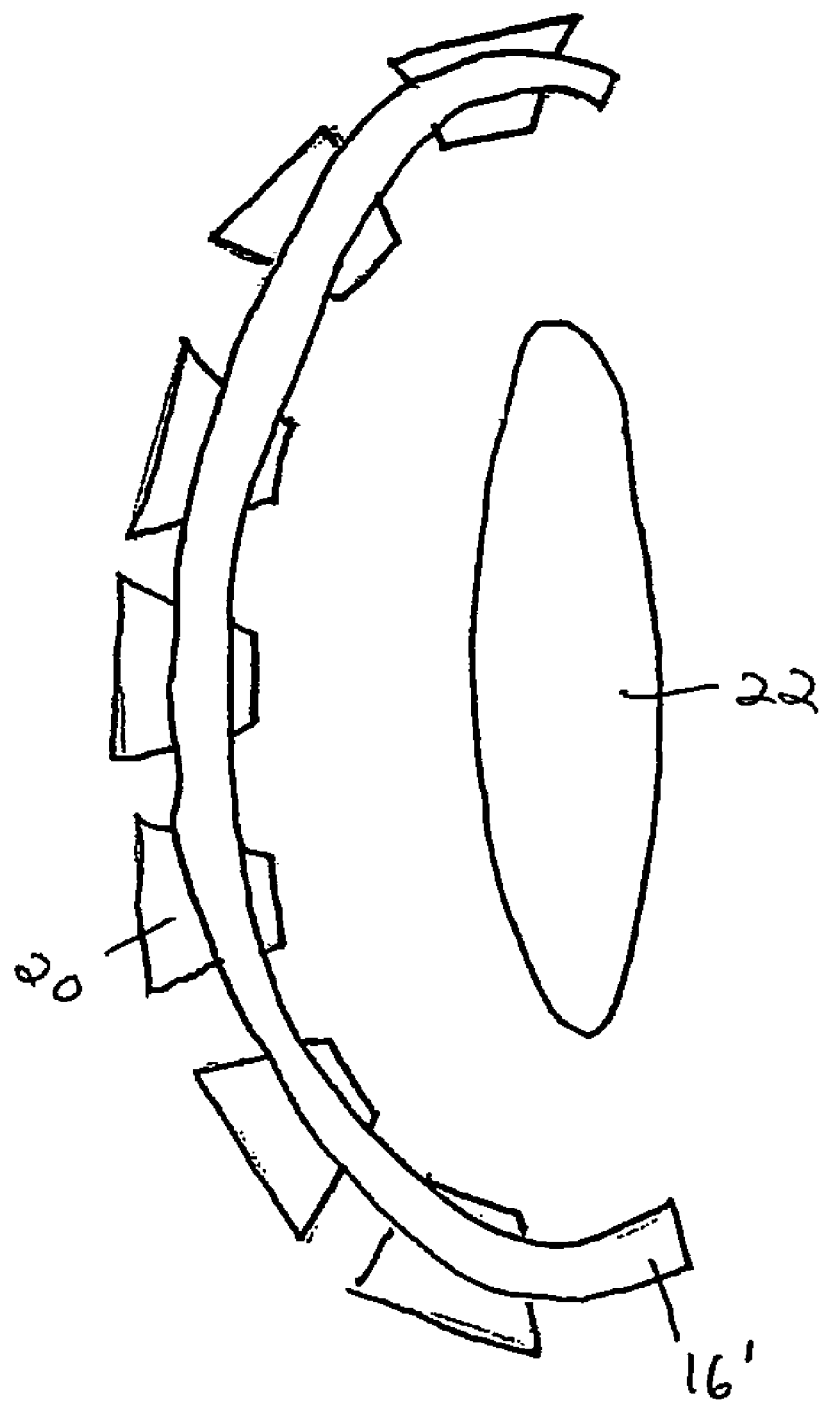
FIG. 4 is a sectional view of an exemplary plate with several devices positioned around an object.

The plates 16 are simply a means by which devices such as cameras and lights may be mounted and held in a stable arrangement. Such plates 16 can be made of plastic or any other material suitable to hold such devices as cameras and lights in stability. The plates 16 are desirably constructed such that devices may be mounted on the plates 16 in a substantially arc-shaped arrangement. FIG. 4 shows an exemplary arc-shaped plate 16' with several devices 20 mounted to the plate 16' and oriented to surround and face an object 22. Note that FIG. 4 only shows a cross section of the plate 16', and that the plate 16' would actually look more like a hemisphere in three dimensions with devices 20 spread out over its surface. The plates 16 or 16' are not essential to the present invention as long as there is some means by which devices may be mounted in a substantially arc-shaped arrangement within the enclosure.

Figure 5:
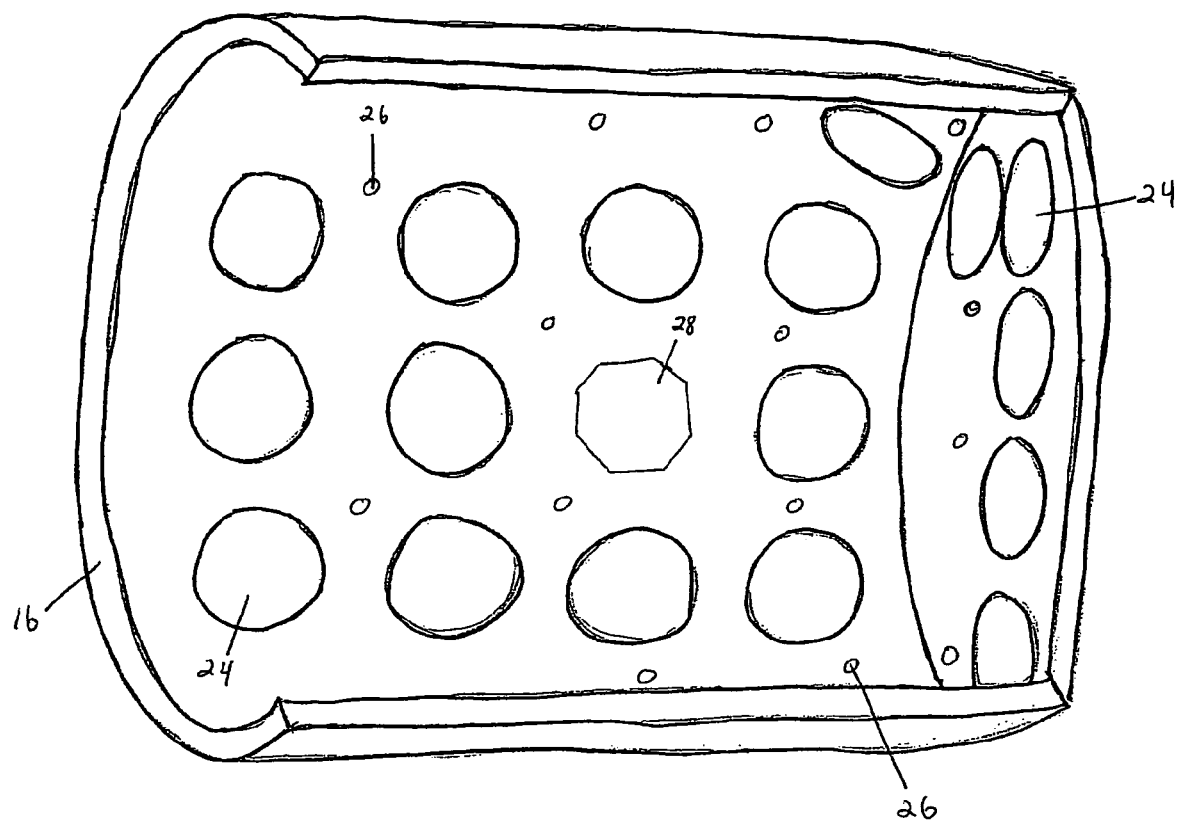
FIG. 5 is a perspective view of a plate, showing how the cameras and lights are arranged in a particular desirable embodiment.
Figure 6:
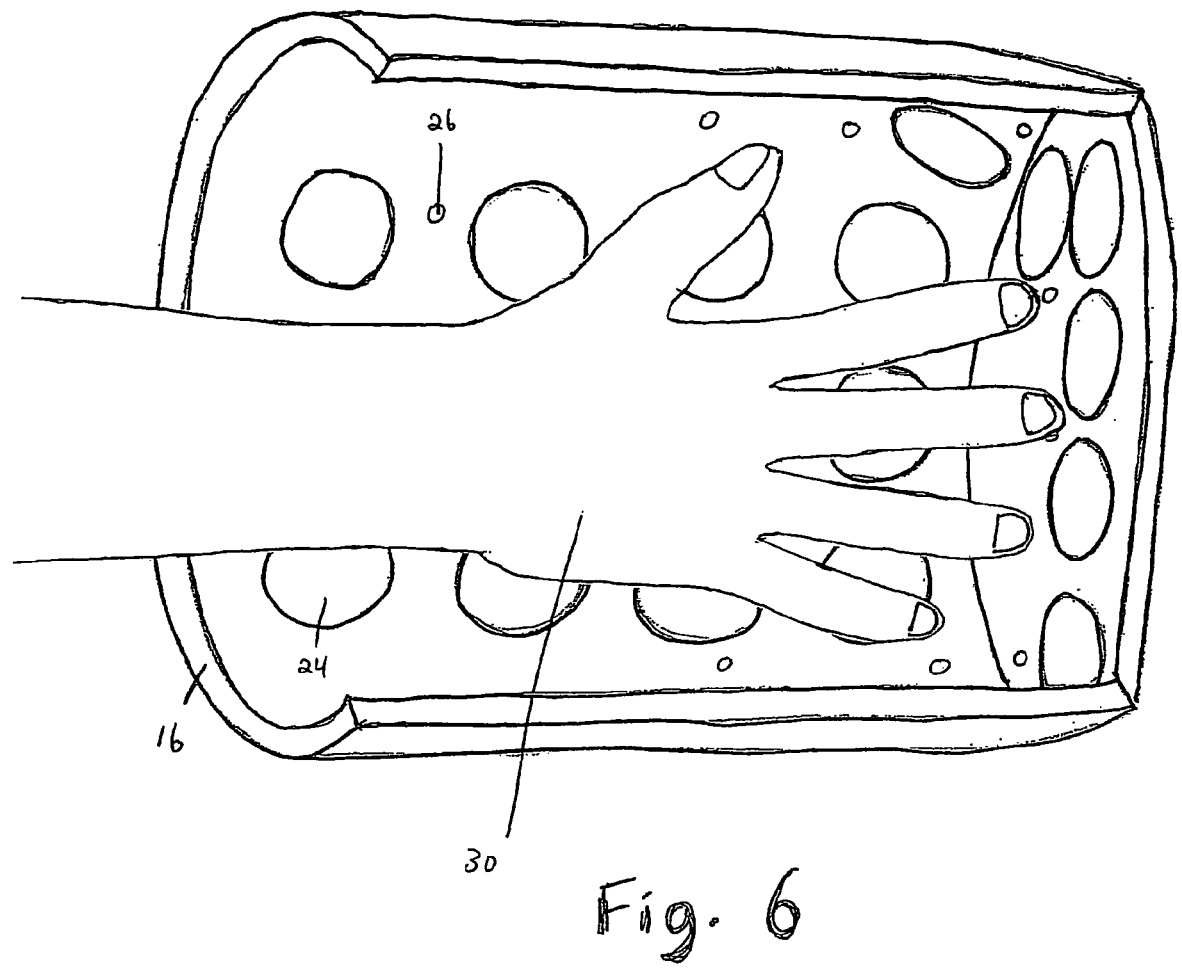
FIG. 6 shows a hand positioned in the plate of FIG. 5 as it would be during operation of the system.
Figure 7A:
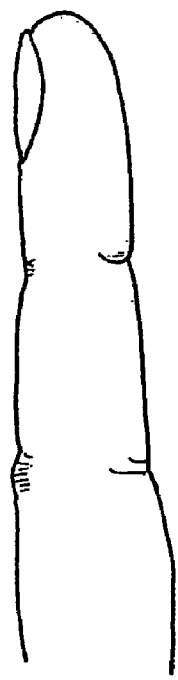
FIG. 7A is a view of the side of a finger.
Figure 7B:
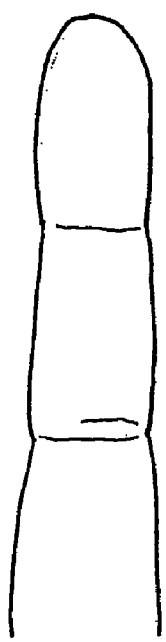
FIG. 7B is a view of the front palm side of a finger.
Figure 7C:
FIG. 7C is a view of the other side of the finger shown in FIGS. 7A and 7B.
Figure 7D:
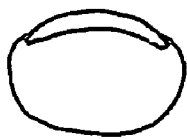
FIG. 7D is a view of the tip of the finger shown in FIGS. 7A-7C.

FIG. 5 shows a desirable embodiment of the plate 16 with a plurality of high resolution cameras 24 and lights 26, as well as a low resolution camera 28. FIG. 6 is a view of FIG. 5 with a hand 30 in place as it would be during operation of the system 10. The hand 30 as shown in FIG. 5 is in an optimal position for the high resolution cameras 24 to capture the desired surfaces of the hand 30. The optimal position of the hand is described in detail below during the description of the system 10 in operation. The low resolution camera 28 is positioned on the plate 16 such that the low resolution camera 28 is substantially perpendicular to the palm of the hand 30 and can photograph the palm, fingers and thumb of the hand in a single image. The high resolution cameras 24 are positioned on the plate 16 around the hand 30 such that the region of the hand 30 which contains biometric information may be photographed by respective cameras 24. The biometric region of the hand 30 intended to be captured by the system 10 consists of the palm of the hand, the front palm side of the four fingers and the thumb, the sides of the four fingers and the thumb, and the tips of the four fingers and the thumb. The substantially arc-shaped arrangement of high resolution cameras 24 becomes crucial so that the cameras may capture the sides and tips of the fingers and thumb. FIGS. 7A-7D show the surfaces of a middle finger which would need to be captured by the high resolution cameras in order to capture all of the sections of the biometric region contained on that finger. Views similar to those of FIGS. 7A-7D would show the corresponding sections of the biometric region of the other fingers and of the thumb.

The high resolution cameras 24 which are used to capture the biometric region of the hand 30 are configured to produce 1000 pixels per inch (PPI) images. The reason for having such high resolution is to acquire the most information contained in the biometric region of the hand. Although the present invention could operate at resolution lower than 1000 PPI, more minutiae of the friction ridges in the biometric region can be captured at resolutions around 1000 PPI, and thus the captured biometric information is more useful for identification and security purposes at such a resolution. The low resolution camera 28, though it may be capable of capturing images at high resolution, should desirably be configured to capture images at resolutions of less than 1000 PPI. At lower resolutions, both the image capturing and the processing speed is faster, which is more desirable for the purposes of tracking the overall position and orientation of the hand as it moves into the enclosure 12. Also, high resolution images are not necessary to capture the position and orientation of the hand for the purposes of the present invention. Moreover, image sensors which can capture high resolution images at high frame rates are typically more expensive than low resolution high frame rate sensors. It also requires substantially less computational resources to process low resolution images.

The precise number of high resolution cameras 24 required to capture the biometric region of the hand 30 is not fixed. The greater the pixel resolution of a camera, the larger the area that can be captured in focus at 1000 PPI. Thus, fewer cameras may be used if they are higher in megapixels as long as they can still collectively capture all surfaces of the biometric region. The capabilities and physical characteristics of the cameras and lenses used will also help determine how far the cameras should be from each other, as well as how far they should be from the respective sections of the biometric region. The types of cameras and lenses will then in turn dictate the necessary dimensions of the plates 16 and the enclosure 12 to accommodate the cameras. For a 5 megapixel Kodak® DX7590 camera with a 1:1 macro lens, it was determined that 18 cameras (including the one which captured images at low resolution) would be adequate. This desirable embodiment is shown in FIGS. 5 and 6.

The lights 26 are positioned around the plate 16 and are preferably placed such that the lights are behind the lenses of the cameras 24 and 28 to minimize direct exposure from the lights 26. The lights 26 should be positioned to illuminate the respective sections of the biometric region of the hand 30 from at least three distinct and predetermined directions. One goal of the system 10 is to create shadowless images of the biometric region. In order to accomplish this, the lights 26 are configured to shine light from different sides of each respective section of the biometric region onto the friction ridges in the respective section. Thus, the peaks of the friction ridges can also be highlighted in each image, while the valleys behind the peaks are relatively less bright, allowing for higher contrast in the images captured. Preferably, the peaks of all of the friction ridges can be illuminated from both sides to highlight the peaks of the friction ridges. The respective sections of the biometric region can be illuminated by capturing images one at a time, with different lighting in each image so that the set of images can later be combined into a single image with no shadows and high contrast between the peaks and valleys of the friction ridges.

Figure 8A:
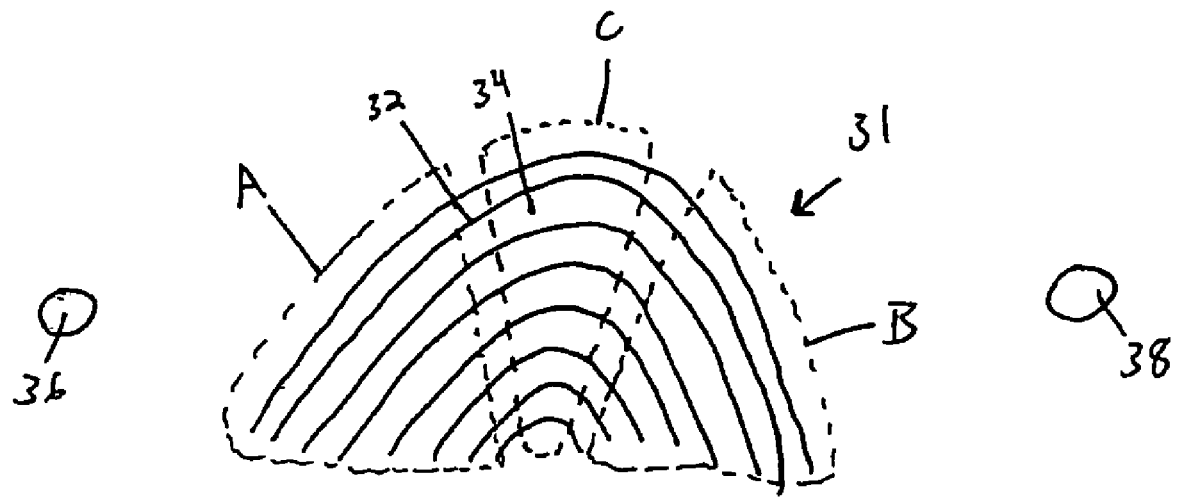
FIG. 8A shows a section of friction ridges illuminated by two lights.
Figure 8B:
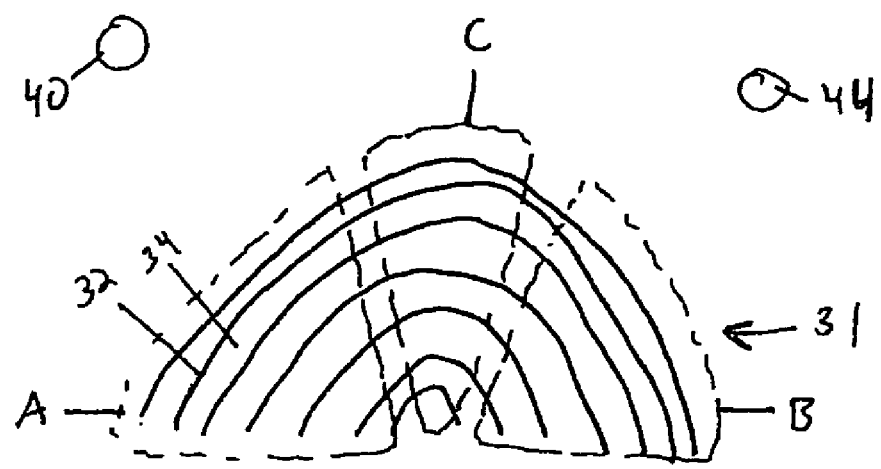
FIG. 8B shows the section of friction ridges of FIG. 8A illuminated by three lights.

FIG. 8A shows an exemplary section 31 of the biometric region with peaks 32 and valleys 34 of the friction ridges and two lights 36, 38 placed on opposite sides of the section 31. The lights 36, 38 can effectively highlight the peaks 32 in regions A and B from their respective sides. However, since the light emitted from lights 36, 38 is nearly parallel with the direction of the friction ridges in region C, it cannot effectively highlight the peaks 32 in region C. By contrast, the section 31 shown in FIG. 8B is illuminated by three lights 40, 42, 44. Between these three lights 40, 42, 44, all of the peaks 32 in the section 31 can be highlighted since at least some of the light emitted by lights 40, 42, 44 is perpendicular to the friction ridges in all three regions A, B, C. Also, each peak can be illuminated by light from opposite sides of the peak. Although two lights as in FIG. 8A were insufficient, three lights as in FIG. 8B are the minimum number of lights necessary to properly illuminate the section 31 shown. It should be emphasized, however, that due to variation between the friction ridge patterns of different hands, three lights per section is truly the minimum. Four lights surrounding each section of the biometric region would be even more effective to ensure that each peak in the respective sections is highlighted from both sides.

The present system 10 can operate with white light, that is, light composed of all of the colors of visible light. However, when white light is reflected off of the friction ridges, the different colors of light will scatter and interfere with each other, which decreases the overall sharpness of any images captured. Monochromatic light, however, can avoid this problem and enhance the sharpness of the images. In particular, blue light is desirable for the purposes of the present invention since its wavelength is one of the shortest in the visible spectrum. While longer wavelengths (redder light) will penetrate the skin tissue, shorter wavelengths are better able to characterize the friction ridges since the light will be reflected off of the surface of the skin. Newly available blue LEDs would be well-suited for the present invention since LEDs are reliable, small, inexpensive, durable, have very long life spans, radiate very little heat, and achieve full brightness faster than other light sources.

Figure 9:
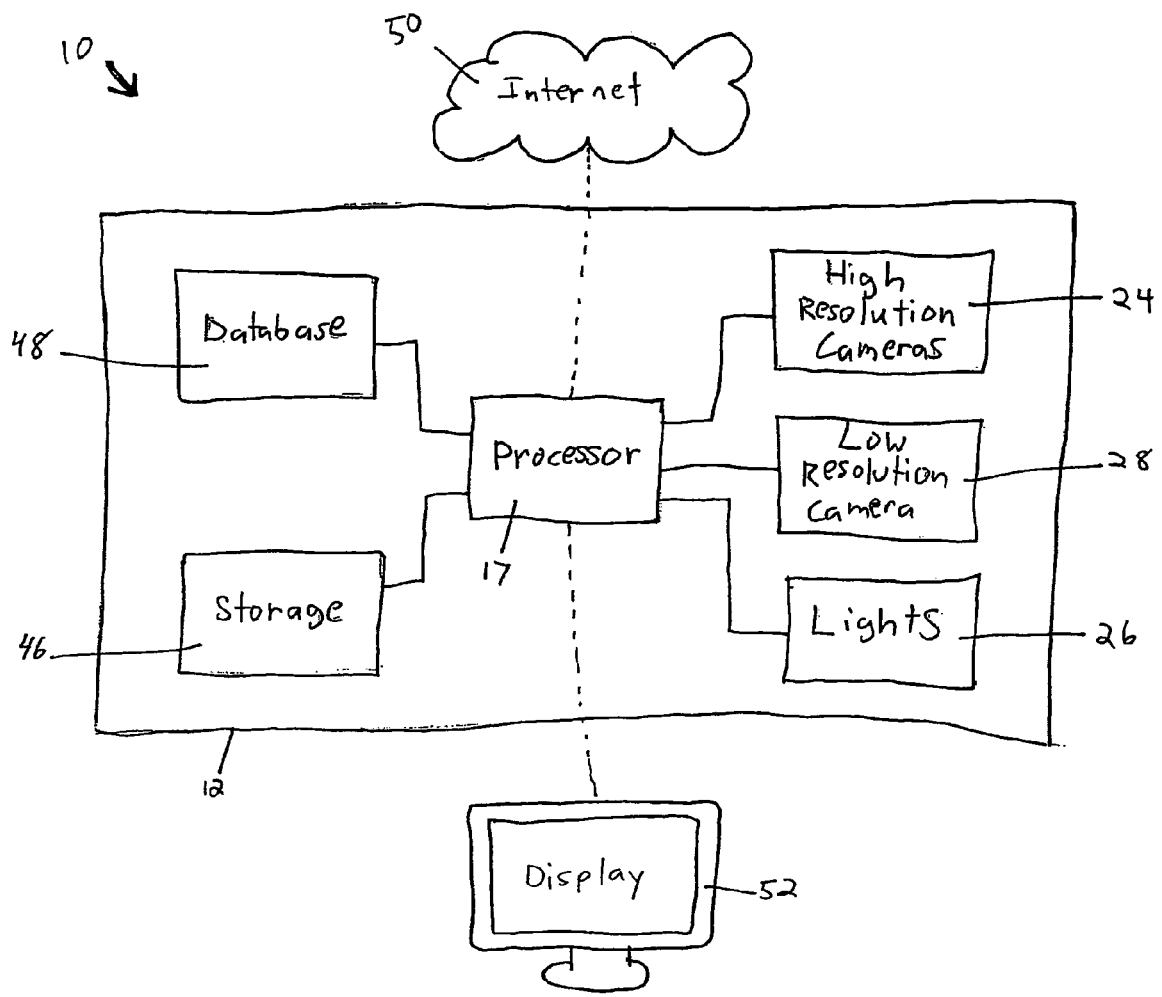
FIG. 9 shows the schematic setup of the present invention.

The system 10 of the present invention also includes a processor 17 as shown in FIGS. 2 and 3. FIG. 9 shows a schematic diagram of the processor 17 as it is connected to several elements both inside and outside the enclosure 12. The processor 17 is connected to both the high resolution cameras 24 and the low resolution camera 28, and is configured to receive image data from them. The processor 17 is also configured to analyze the images from the low resolution camera 28 to determine the position and orientation of the hand. A desirable means by which the processor 17 can conduct this analysis is through the use of active appearance models as discussed below. The processor 17 is also connected to the lights 26 and is configured to flash the lights 26 on and off individually or in groups. Desirably, the processor 17 and lights 26 are configured such that the lights 26 may be flashed individually in a rapid sequence for reasons set forth below.

The processor 17 is further configured to perform numerous manipulations of the image data received from the high resolution cameras 24 and the low resolution camera 28 to create output data. Generally, these manipulations relate to compiling the images of respective sections of the biometric region into an overall image of the biometric region and optimizing contrast in the overall image. Furthermore, the processor 17 could also convert the images into grayscale or black and white and create simulated rolled fingerprints from the overall image. These manipulations will be described in greater detail below in the discussion of the system 10 in operation.

As shown in FIG. 9, the processor 17 is connected to a storage device 46 such as a hard drive which is configured to store image data from the high resolution cameras 24 and the low resolution camera 28. The storage device 46 is also configured to send stored image data back to the processor 17 so that the processor may perform the manipulations of the image data to create the output data, which in turn can also be stored by the storage device 46. Optionally, the processor 17 may also be connected to a database 48, stored on a hard drive for example, which contains images that can be cross-referenced with those captured by the system 10 or created as output data by the processor 17. For example, the database 48 could contain fingerprint images from the records of law enforcement agencies where the system 10 is used at border patrols, or could contain images of the hands of authorized personnel where the system 10 is used at secure entrances to buildings for verification purposes.

It should be noted that the storage device 46 and the database 48 can be separate and distinct elements as shown in FIG. 9, but both of their function can be accomplished by a single data storage device such as a hard drive. It should also be noted that the processor 17, the storage device 46 and the database 48, though shown within the enclosure 12 in FIG. 9, need not be located inside of the enclosure 12 for the system 10 to properly operate. As long as the processor 17 is connected to the high resolution cameras 24, the low resolution camera 28, and the lights 26, then the processor 17, the storage device 46, and the database 48 may all be located outside of the enclosure. However, for the convenience of having the system 10 be self-contained within the enclosure 12, it may be desirable to place the processor 17, the storage device 46, and the database 48 within the enclosure 12.

The processor 17 may optionally be connected to a distributed communications network, such as the Internet 50. Rather than having the processor 17 connected to a database 48 of images, the images can instead be downloaded by the processor 17 from other databases via the Internet 50 and stored on the storage device 46. Also, the image data captured by the high resolution and low resolution cameras 24 and 28, as well as the output data from the processor 17, can be transferred through the Internet or made available for download. The image data from the high resolution and low resolution cameras 24 and 28, the output data, and the images in the database 48 or from the Internet 50 can be displayed on a display 52 such as a computer monitor. An operator of the system 10 can then determine from the images on the display 52 whether the system 10 is properly capturing the image data, properly manipulating the image data into the output data, or properly cross-referencing the images in the database 48 with images captured or manipulated by the system 10. Alternatively, these determinations could be made by the processor 17, which then could give a visual indication on the display 52 to the operator as to whether the data is acceptable. That way, no special training in data analysis would be required of the operator.

In an alternative embodiment, the database 48 may be remote from the system 10. The system 10 may be configured such that after capture of the biometric image data, the biometric data may be transmitted via the Internet 50 to a remote computer for further processing and/or storage. Accordingly, cross-referencing and/or comparison of the captured biometric image data with existing biometric image data may be performed at a facility that is geographically remote from a facility in which the system 10 operates. It is to be understood that the remote computer may have the necessary hardware and software operative thereon for supporting the cross-referencing and/or comparison analysis. Thereafter, data representative of the results of the analysis or related processing may be transmitted back to the system 10 via the Internet 50. It is to be understood that the data capture, transmission thereof, and receipt of the comparison analysis may be accomplished in real-time or near real-time (e.g., subject to network communications latency) to effect efficient biometric scanning verification.

In operation, the system 10 first receives a hand through the opening 14 of the enclosure 12. The lights 26 should be on at this point so that the hand may be imaged by the low resolution camera 28. Desirably, the interior surface 18 of the enclosure 12 is non-reflective, and is uniform and dark in color. If the interior surface 18 were reflective, then light from the lights 26 could reflect off of the interior surface 18 and be more intense than the light reflected off of the hand. This would make it more difficult to see the details of the hand in the images captured by the low resolution and high resolution cameras 28 and 24. Likewise, the enclosure 12 should be constructed of a substantially opaque material so that external light minimally penetrates into the enclosure 12. Once the hand is inserted into the enclosure 12, the low resolution camera 28 can capture first image data to determine the position, orientation and hand geometry of the hand. The first image data is captured by the low resolution camera 28 as the hand enters into the enclosure 12 and becomes oriented in front of the plates 16.

The position, orientation and hand geometry of the hand can be determined from the images captured by the low resolution camera 28. One method for accomplishing this using 5 pegs to locate the hand and separate the fingers is discussed in *A Prototype Hand Geometry-based Verification System*, A. Jain, A. Ross, & S. Pankanti, AVBPA, 1999. Another method using hand-tuned parameters to extract feature point locations is discussed in *Projective Invariant Hand Geometry: An Overview*, G. Zheng, T. Boult, & C-J Wang, Biometric Symposium, 2005. These methods and other similar ones typically rely on heuristics (which can lead to slow processing) or physical setup restrictions such as hand position or lighting requirements which result in a loss of friction ridge information. Desirably, Active Appearance Models (AAM) can be used to determine the position and orientation of a hand because AAM can accomplish the same objectives with greater speed and precision. Also, AAM can extract the hand geometry information without the setup restrictions which lead to a loss of biometric information.

Figure 10:
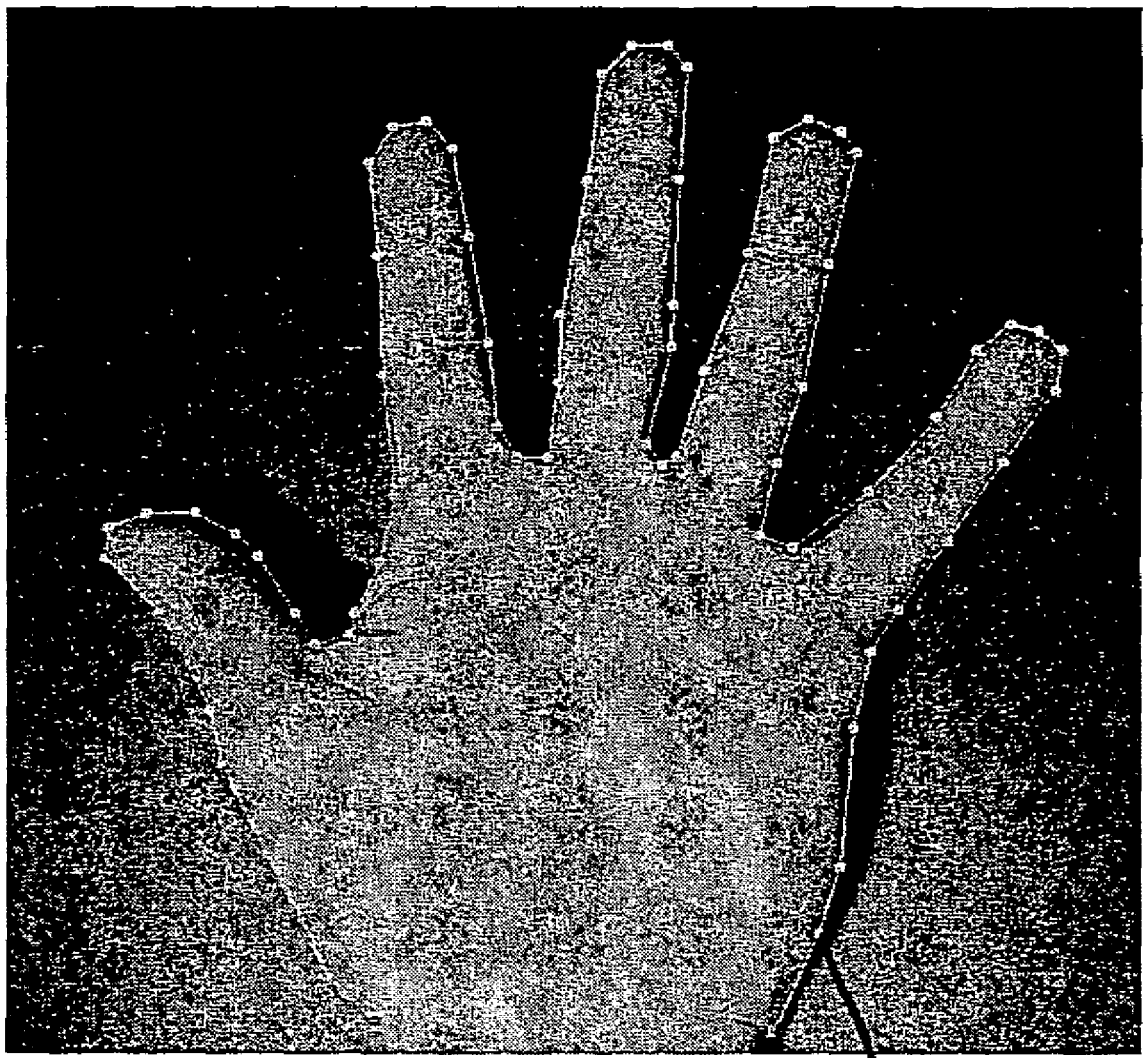
FIG. 10 shows a hand with manually labeled Active Appearance Model vertices.

AAM is desirably used in the present invention as follows. By first manually labeling fixed points, or vertices, on many different training images of hands, a model set of vertices is calculated from the training images. FIG. 10 shows an exemplary hand which has been manually labeled with AAM vertices 54. A new or unseen hand can then be fit with a similar set of vertices 54 by the AAM while the low resolution camera 28 is capturing the first image data. This fitting is achieved by virtue of the fact that different people's hands have similar shapes and proportions. Once a new hand is fitted by the AAM, the model can be used to extract arbitrary portions of the hand, such as the fingertips. The shapes, distances and proportions of the parts of the hand can be accurately measured by the AAM to capture the position, orientation and hand geometry of the new hand. The accuracy of the AAM increases when the object is in an initial orientation that is relatively close to those of the model set created from the training images. Thus, the active appearance models will be less accurate when a hand is inserted into the enclosure 12 in a position that is very different from the optimal orientation, e.g., when the hand is in a fist or when the palm is perpendicular to that of a palm in the optimal orientation. However, the AAM will tolerate some difference in size and orientation while still yielding an accurate fit.

In order to capture the position and orientation of the hand with the low resolution camera 28 when it enters the enclosure 12, the metes and bounds of the hand must be distinguished from the interior surface 18 of the enclosure 12. One method for accomplishing this is to utilize a skin color detection method which allows the processor 17 to recognize which pixels in the images captured by the low resolution camera 28 correspond to the skin on the hand. However, variation in skin color can render this method unreliable. A second method is to utilize motion segmentation, which computes frame-by-frame image differences to locate the outline of the hand as it moves. However, this method's results are less accurate when the hand is not moving substantially, and so is not very desirable for the purposes of the present invention. A third method is use an image segmentation algorithm which attempts to identify coherent foreground objects in images using features such as color and texture. However, this method is comparatively slow, and so not desirable for the real-time application of the present invention.

A background subtraction algorithm is a desirable method by which to quickly locate the metes and bounds of the hand, since it is a simple algorithm which does not depend on the color, texture or movement of the hand. A background subtraction algorithm can locate the hand in the images captured by the low resolution camera 28 by distinguishing the hand from the interior surface 18 of the enclosure 12 with substantially less processing, and thus more speed than the above methods. Desirably, the interior surface 18 is uniform and dark in color. That way, the contrast between the illuminated hand and the interior surface 18 is maximized and the background subtraction is expected to perform extremely well. Additionally, the fact that interior surface 18, the low resolution camera 28, and the lights 26 are all static will help to maximize the effectiveness of the background subtraction. After the background subtraction is performed, connected component analysis (e.g., connected related items) and noise suppression (e.g., account for unrelated objects, such as noise) must be performed to create a continuous foreground region, as will be understood by those skilled in the art. Once the metes and bounds of the hand are identified, the AAM can fit the model to the hand. It should be noted that the boundaries of the hand need not be extremely precise to allow the AAM to construct a fit, though the higher the precision of the boundaries, the better the fit will be.

The hand initially enters the enclosure 12 in a first orientation. This first orientation is not necessarily a proper orientation for the high resolution cameras 24 to be able to capture all of the respective sections of the biometric region of the hand. The high resolution cameras 24 are statically positioned such that the hand must be in an optimal orientation in order for the biometric region to be captured. The optimal orientation of a hand is substantially as shown in FIG. 6 and FIG. 10. The fingers and thumb should all be substantially coplanar. If the fingers are too far bent, the fingers are not spread apart enough, the fingers are spread apart too much, or the palm is rotated too far from being perpendicular to the low resolution camera 28, the high resolution cameras 24 will not be able to capture all of the respective sections of the biometric region. One way to ensure that the hand is in the optimal orientation is to have it engage with posts or a contoured surface on the interior surface 18 of the enclosure 12. However, such guides may obstruct the camera views of the biometric region and thus result in gaps in the data acquired. Thus, desirably, the optimal orientation should be obtained without the use of obstructive guides.

Figure 11:
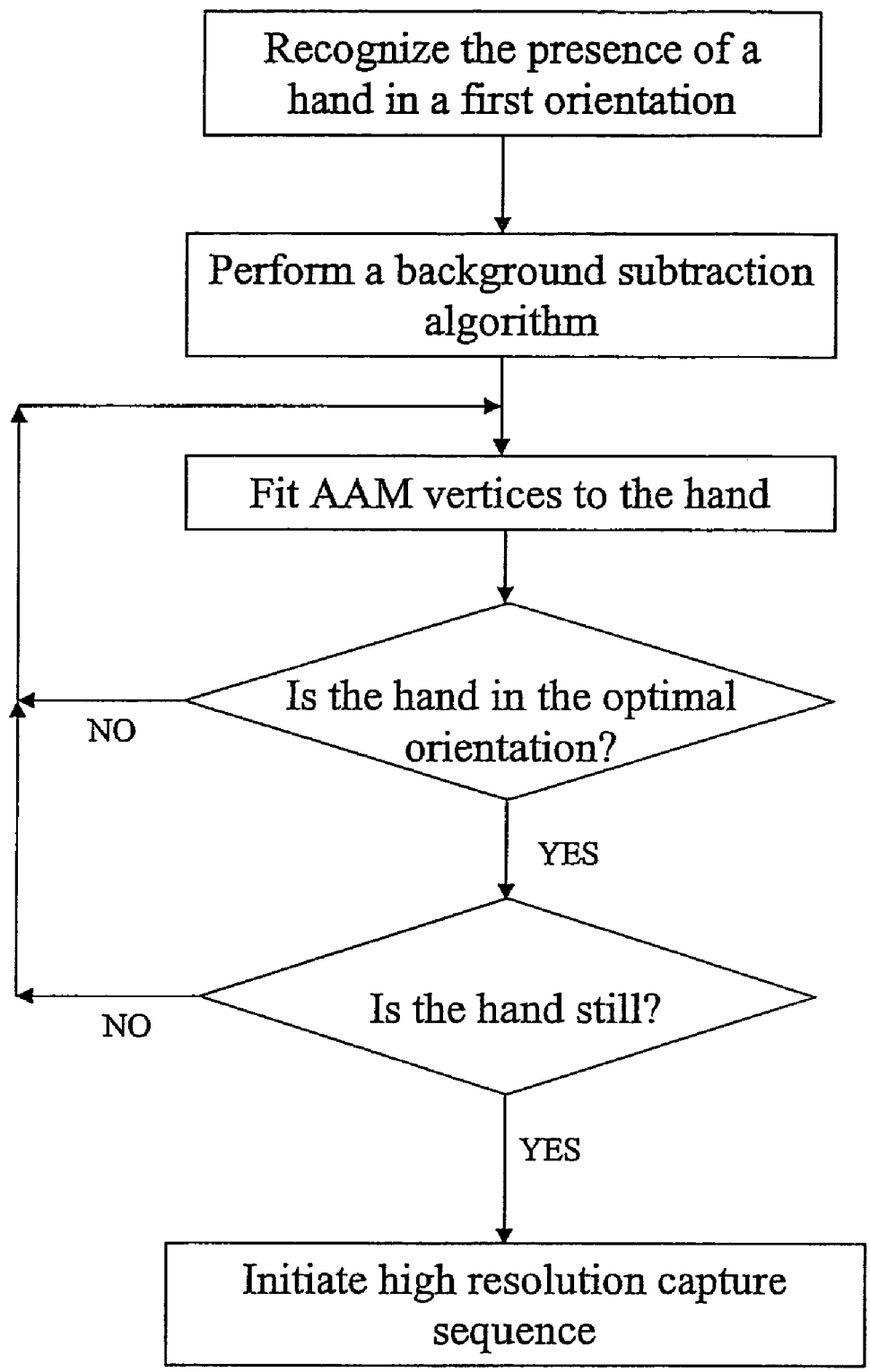
FIG. 11 is a flowchart showing how first image data is used to determine when a high resolution capture sequence should begin.

The processor can use AAM to determine the orientation of the hand when it enters in the first orientation by calculating the relative distances between the AAM vertices 54. The processor 17 can be configured to recognize when certain conditions between respective vertices 54 are met. Based on known relationships between these vertices 54 for a hand, the processor 17 can determine when the fingers and thumb are straight by calculating the distance between the vertices 54 along the fingers and thumb. The amount that the fingers and thumb are spread apart can be determined by calculating the distances between the vertices 54 along adjacent fingers. The amount of rotation of the palm away from being perpendicular to the low resolution camera 28 can be determined by calculating the distances between the vertices 54 on opposite sides of the palm; alternatively, because of the variation in sizes and proportions of a hand, the amount of palm rotation may be more accurately determined from analysis of images capturing the sides of the palm. The processor 17 should be configured to recognize when the vertices 54 are all positioned such that the aforementioned calculated distances between respective vertices are within predetermined ranges. These predetermined ranges correspond to the hand being in the optimal orientation. Accordingly, it may be understood that analysis of the first image data to determine if the hand is in the optimal orientation includes steps associated with locating the hand in the first image data by distinguishing the hand from the background, and determining if the position and orientation of the hand is in a predetermined range of proper orientations corresponding to the optimal orientation. Once the hand is recognized to be in the optimal orientation and to have stopped moving, the high resolution capture sequence is initiated. FIG. 11 shows the steps taken by the system 10 up to this point in the capturing process.

Figure 12:
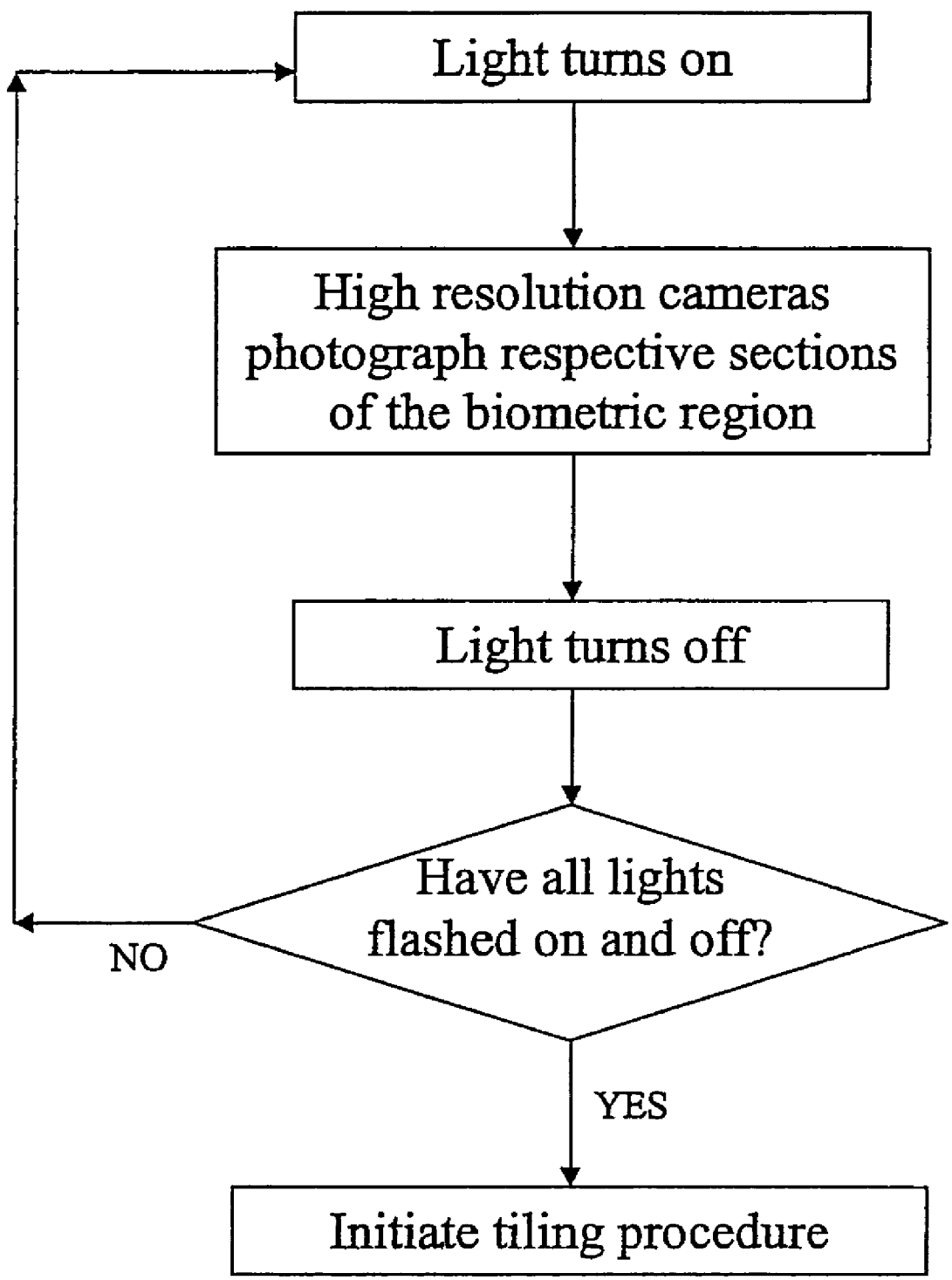
FIG. 12 is a flowchart showing a high resolution capture sequence.

The high resolution capture sequence starts with a flash of one of the lights 26. The flash should be a very quick turning on and off of the light 26, as is typically done in the art of photography. During the flash, the high resolution cameras 24 each photograph the respective sections of the biometric region to capture second image data. Then, once the first light 26 has been extinguished, another one of the lights 26 will flash and each high resolution camera 24 will again capture second image data. This process continues until all of the lights 26 have flashed in sequence. FIG. 12 shows the steps involved in the high resolution capture sequence. Depending upon the positioning and number of high resolution cameras 24 and lights 26 in the system 10, not every high resolution camera 24 may need to take photographs during every flash of the lights 26. The high resolution cameras 24 need only capture enough second image data to adequately show the peaks 32 and valleys 34 of the friction ridges in each respective section of the biometric region. The above discussion related to the number of lights 26 needed per section dictates the necessary number of images of each section. The system 10 could capture the biometric region by having only one high resolution camera 24 photograph one section of the biometric region during each flash. However, it is preferred that the flashing of the lights 26 and the capturing of the second image data by the high resolution cameras 24 occur as quickly as possible. With current technology, the high resolution capture sequence can be completed in a fraction of a second. The faster the high resolution capture sequence, the less likely that movement of the hand will cause the images of each respective section of the biometric region to be inconsistent with each other with regard to the hand's orientation. Thus, it is preferred that multiple high resolution cameras 24 capture images during each flash to minimize the amount of time necessary to capture the biometric region. There may be determinations as to whether movement of the hand would cause such inconsistencies sufficient to cease the high resolution capture sequence and start over. Such determinations can be automatically made by the processor 17 based on predetermined parameters or, alternatively, could be made by an operator viewing the output data on a display 52.

Figure 13:
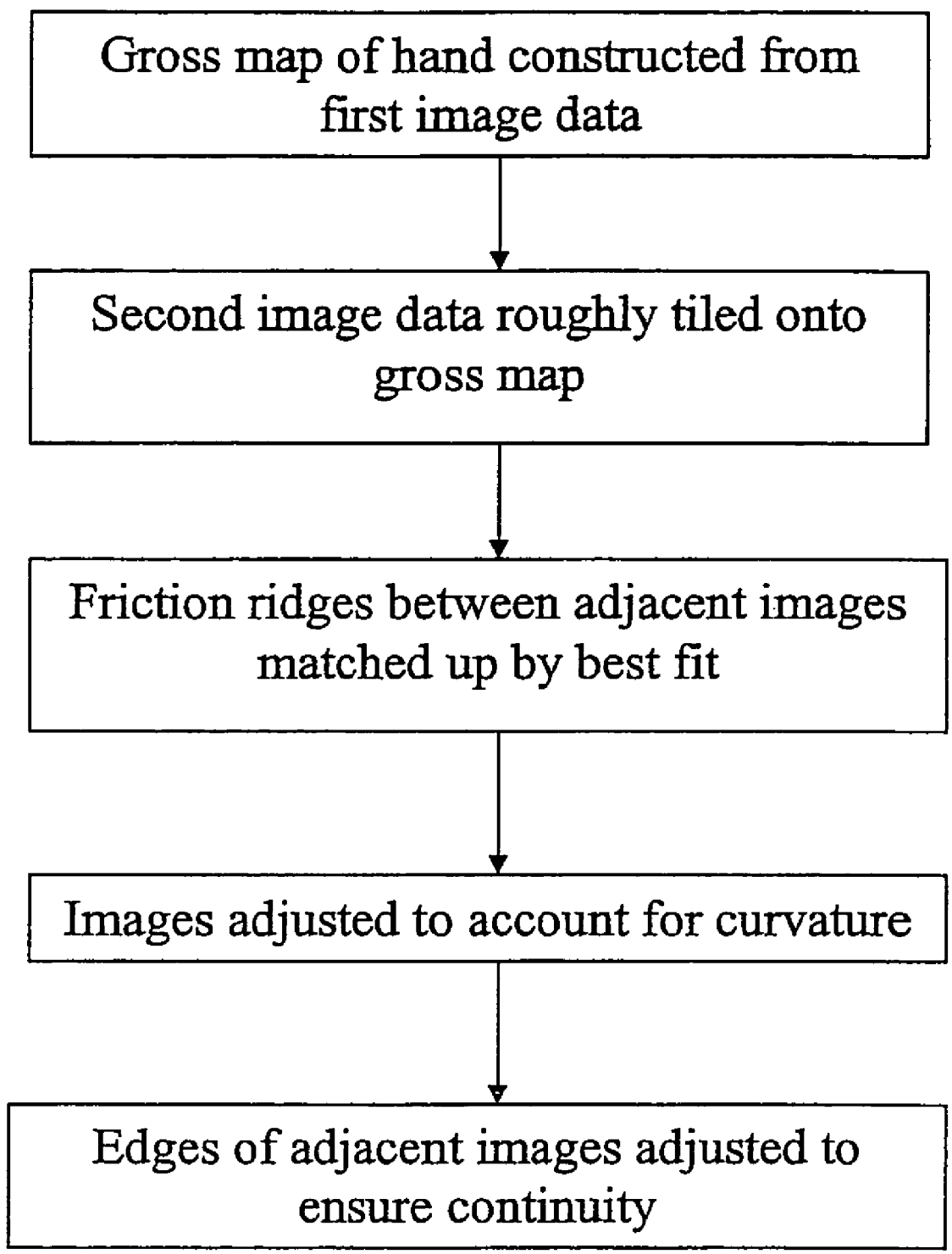
FIG. 13 is a flowchart showing a tiling procedure.

Once all of the second image data has been captured, the tiling procedure may begin. FIG. 13 shows the steps involved in the tiling procedure. First, a gross map of the hand is created based on the first image data. The gross map is a two-dimensional representation of the hand, desirably coming from the AAM fit of the hand for precision purposes. The images of each section of the biometric region are roughly tiled onto the corresponding area of the gross map by matching up certain points in the second image data to the corresponding points in the gross map. The high resolution images are rotated and scaled as appropriate to properly align all of the second image data on the gross map. The rotation and scaling of the second image data is accomplished by virtue of the fact that the relative positions and orientations of the high resolution cameras 24 within the system 10 are known. Since the AAM fit of the hand yields a large number of vertices 54 around the hand, this initial tiling is faster and more accurate than other methods known to those skilled in the art. While some other methods of tiling adjacent images together simply put adjacent pixels from different images together, the present method intentionally leaves overlapping regions to allow for more accurate fine fitting. In an alternative embodiment, tiling of the images may be accomplished based solely on known static camera properties. For example, knowledge of each camera's position, focal length, viewing angle, etc. provides information used by the processor 17 for tiling purposes. In a software context, triangles or other geometric shapes may be used for tiling purposes. Desirably, each pixel is addressable within the geometric shape during the scaling procedure. Interpolation may be used to account for missing pixels.

The system 10 may be configured to account for tilt, pose, orientation, curvature and placement of the hand via AAM or other methodologies. For example, the ability to account for pose, orientation and placement may be inherent in AAM, whereas tilt and curvature may be accounted for and adjusted via refined camera positioning. For example, the cameras 24 used to obtain fingertip image data may be used in determining axis orientation of the hand. Alternatively, a second low resolution camera (not shown) may be placed above the fingertips to view a Z-axis of the hand. In any case, it is to be understood that the objective of accounting for tilt, pose, orientation, curvature and placement of the hand may be accomplished via either software or hardware implementations.

After the rough tiling, the positions of adjacent images are corrected to reflect the best fit of the friction ridges between the adjacent images. The second image data may then be adjusted to account for the curvature of the biometric region by using various techniques including, but not limited to, warping. The next step involves adjusting (e.g., warping) the adjacent images to ensure that the friction ridges are continuous. Here, the use of interpolations should be minimized so that the fine and subtle features of the friction ridges are minimally altered. At any point in the tiling procedure, there may be a quality check to ensure that the output data meets predetermined quality standards. This check may be automated by the processor 17 or could be determined by an operator viewing the output data on a display 52.

After the tiling procedure has been completed and an overall image of the biometric region has been compiled from the second image data, the overall image can then be optimized with regard to contrast. A gross lighting adjustment can be made in order to account for non-uniformity between the different images. Then, a pixel selecting algorithm may be performed to select individual pixels from all of the images of each respective section of the biometric region under different illuminations. The pixels should be selected to show optimal contrast between the peaks 32 and valleys 34 of the friction ridges, and also to ensure that the resulting image is shadowless. Establishing the various friction ridge heights determines which view provided by the respective cameras 24 provides the best or most accurate ridge information. Accordingly, that camera's captured image is used in the image processing.

The overall image can then be converted to conform to standard formats (e.g. those of law enforcement agencies) for the purposes of matching biometric data with other samples.

The overall image can be converted to grayscale and then into black and white. The equivalent of rolled fingerprints can be produced by performing a pressure deformation algorithm which simulates the deformities caused by pressing a finger against a surface. The pressure deformation algorithm operates by accounting for the known elastic properties of the fingers and skin and how the friction ridges on the surface of the skin are affected by such pressures. The width of peaks 32 and valleys 34 may also be altered to conform with standard formats. The output data can finally be subjected to a feature extraction algorithm to locate the distinguishing features of the subject hand, which can then be compared with other images for cross referencing.

The above invention has been described with reference to desirable and alternative embodiments. Obvious modifications, combinations, and alterations will occur to others upon reading the preceding detailed description. It is intended that the invention be construed as including all such modifications, combinations and alterations insofar as they come within the scope of the appended claims or the equivalents thereof.

The invention claimed is:

1. A system for capturing biometric data of a hand comprising:
   an enclosure having an opening adapted to receive a hand in a first orientation;
   a low resolution camera within the enclosure, wherein the camera is positioned substantially perpendicular to the palm of the hand so as to capture the palm, fingers and thumb of the hand in a single image;
   a plurality of high resolution cameras arranged in a substantially arc-shaped configuration, wherein the high resolution cameras are positioned to capture images corresponding to respective sections of a biometric region of the hand, wherein the images captured by said high resolution cameras, when combined, span the biometric region of the hand;
   a plurality of lights within the enclosure positioned to illuminate each respective section of the biometric region from at least three different directions; and
   a processor connected to the low resolution camera, the high resolution cameras and the lights, wherein the processor is configured to:
      receive first image data of the hand positioned in the first orientation from the low resolution camera;
      analyze the first image data to determine if the first orientation of the hand is in the optimal orientation;
      flash the lights;
      receive second image data of the respective sections of the biometric region from the high resolution cameras;
      construct a gross map of the hand using the first image data;
      tile the second image data onto the corresponding areas of the gross map;
      match friction ridges between adjacent images of the second image data; and
      perform a pixel selecting algorithm of the images in the second image data to select pixels which show the greatest contrast between the peaks and valleys of the friction ridges.

2. The system of claim 1, wherein the enclosure has an interior surface which is substantially non-reflective.

3. The system of claim 1, further comprising a contoured surface on the interior of the enclosure, wherein the contoured surface is configured to engage with a hand to retain the position of the hand in the optimal orientation.

4. The system of claim 1, wherein the lights are blue LEDs.

5. The system of claim 1, further comprising a storage unit for storing the first image data, second image data, and output data from the processor.

6. The system of claim 1, further comprising a display connected to the processor, wherein the display is capable of displaying the first and second image data and output data.

7. The system of claim 1, wherein the processor is connected to a database of images containing biometric information from other hands, and wherein the processor is configured to compare output from the processor with the biometric information in the database.

8. The system of claim 7, wherein the output is converted to a rolled ink equivalent prior to comparison with the biometric information.

9. The system of claim 1, wherein the processor is further configured to:
   convert the second image data into grayscale images; and
   convert the grayscale images into black and white images.

10. The system of claim 9, wherein the processor is further configured to apply a pressure deformation algorithm to the black and white images.

11. The system of claim 1, wherein the processor is further configured to adjust the respective images in the second image data to account for curvature of the biometric region and ensure continuity between adjacent images.

12. A method for capturing biometric data of a hand comprising:
   imaging a predefined area by capturing a plurality of images thereof with a hand in the area;
   analyzing each of the plurality of images to determine if the hand is in an optimal orientation to capture images of a biometric region of the hand;
   flashing at least one light out of a plurality of lights and capturing at least one image of at least one respective section of the biometric region during the flash of light;
   storing the images of respective sections of the biometric region on a storage device;
   constructing a gross map of the hand;
   tiling images of respective sections of the biometric region onto the gross map;
   matching the friction ridges between adjacent images of respective sections of the biometric region; and
   performing a pixel selection algorithm to select the pixels in the images of respective sections of the biometric region which show the greatest contrast between peaks and valleys of friction ridges on the hand.

13. The method of claim 12, wherein the predefined area is contained within an enclosure, wherein the enclosure comprises an opening adapted to receive a hand and an interior surface which is substantially non-reflective.

14. The method of claim 12, wherein the plurality of images of the predefined area is captured with a low resolution camera.

15. The method of claim 12, wherein the analysis of the orientation of the hand is done using active appearance models.

16. The method of claim 12, wherein the images of the respective sections of the biometric region are captured using a plurality of high resolution cameras.

17. The method of claim 12, wherein the lights are blue LEDs.

18. The method of claim 17, wherein the lights in the plurality of lights are flashed individually in a rapid sequence, and wherein high resolution cameras capture multiple respective sections of the biometric region during each flash.

19. The method of claim 12, further comprising the steps of:
   converting images of respective sections of the biometric region into grayscale images; and
   converting the grayscale images into black and white images.

20. The method of claim 19, further comprising the step of applying a pressure deformation algorithm to the black and white images.

21. The method of claim 12, further comprising the step of adjusting the images of respective sections of the biometric region to account for curvature of the biometric region and ensure continuity between adjacent images.

22. The method of claim 12, further comprising the steps of:
   optionally converting the biometric data of the hand into a rolled ink equivalent;
   transmitting one of the biometric data of the hand and the rolled ink equivalent to a remote computer; and
   comparing one of the biometric data of the hand and the rolled ink equivalent to biometric data of a hand stored on the remote computer.

23. The method of claim 22, further comprising the step of previously converting a photographed latent hand print into the respective biometric data of the hands stored on the remote computer.

* * * * *

UNITED STATES PATENT AND TRADEMARK OFFICE
CERTIFICATE OF CORRECTION

PATENT NO. : 7,660,442 B2 Page 1 of 1
APPLICATION NO. : 11/515228
DATED : February 9, 2010
INVENTOR(S) : Sweeney et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 831 days.

Signed and Sealed this

Thirtieth Day of November, 2010

David J. Kappos
*Director of the United States Patent and Trademark Office*